(12) United States Patent
Noguchi

(10) Patent No.: US 10,912,263 B2
(45) Date of Patent: Feb. 9, 2021

(54) EMITTER AND TUBE FOR DRIP IRRIGATION

(71) Applicant: Enplas Corporation, Saitama (JP)

(72) Inventor: Koji Noguchi, Saitama (JP)

(73) Assignee: ENPLAS CORPORATION, Saitama (JP)

( * ) Notice: Subject to any disclaimer, the term of this patent is extended or adjusted under 35 U.S.C. 154(b) by 10 days.

(21) Appl. No.: 16/335,272

(22) PCT Filed: Aug. 25, 2017

(86) PCT No.: PCT/JP2017/030435
§ 371 (c)(1),
(2) Date: Mar. 21, 2019

(87) PCT Pub. No.: WO2018/055977
PCT Pub. Date: Mar. 29, 2018

(65) Prior Publication Data
US 2019/0281774 A1    Sep. 19, 2019

(30) Foreign Application Priority Data

Sep. 21, 2016 (JP) ................................. 2016-184380

(51) Int. Cl.
*A01G 25/02* (2006.01)
*A01G 25/16* (2006.01)
(Continued)

(52) U.S. Cl.
CPC .......... *A01G 25/023* (2013.01); *A01G 25/16* (2013.01); *B05B 1/3006* (2013.01); *B05B 1/202* (2013.01); *Y02A 40/22* (2018.01)

(58) Field of Classification Search
CPC .... A01G 25/023; A01G 25/16; B05B 1/3006; B05B 1/202; Y02A 40/237
(Continued)

(56) References Cited

U.S. PATENT DOCUMENTS

| 6,027,048 | A | 2/2000 | Mehoudar |
| 6,464,152 | B1* | 10/2002 | Bolinis ............... A01G 25/023 239/542 |
| 2015/0223414 | A1* | 8/2015 | Kidachi .............. A01G 25/023 239/542 |

FOREIGN PATENT DOCUMENTS

| CN | 105792638 A | 7/2016 |
| EP | 3387897 A1 | 10/2018 |
| JP | 2010-046094 A | 3/2010 |

OTHER PUBLICATIONS

International Search Report from International Application No. PCT/JP2017/030435 dated Nov. 21, 2017.
(Continued)

*Primary Examiner* — Christopher S Kim
(74) *Attorney, Agent, or Firm* — Brundidge & Stanger, P.C.

(57) ABSTRACT

An emitter includes a water intake part, a pressure-reducing flow path part, a first flow-rate adjusting part, a second flow-rate adjusting part, and a discharge part. The first flow-rate adjusting part includes a first valve seat, a first communication hole, a first diaphragm part, and a valve body. The valve body is disposed between the first diaphragm part and an opening of the first communication hole. The valve body moves toward the first communication hole as the first diaphragm part approaches the first valve seat. The shape of the valve body is such that, when the traveling distance of the valve body is less than or equal to a predetermined value, the gap decreases as the valve body moves and such that, when the traveling distance of the valve body exceeds the predetermined value, the gap increases as the valve body moves.

9 Claims, 7 Drawing Sheets

(51) Int. Cl.
B05B 1/30 (2006.01)
*B05B 1/20* (2006.01)

(58) Field of Classification Search
USPC .......................................................... 239/542
See application file for complete search history.

(56) References Cited

OTHER PUBLICATIONS

Extended European Search Report from EP Appln. No. 17852756.0 dated Apr. 3, 2020, 9 pages.

* cited by examiner

EMITTER AND TUBE FOR DRIP IRRIGATION

TECHNICAL FIELD

The present invention relates to an emitter and a drip irrigation tube including the emitter.

BACKGROUND OF THE INVENTION

Conventionally, a drip irrigation method is known as a method for cultivating plants. In the drip irrigation method, a drip irrigation tube is disposed on the soil where plants are planted, and irrigation liquid such as water, liquid fertilizer, and/or the like is dropped to the soil from the drip irrigation tube. The drip irrigation method has been increasingly attracting attention in recent years since the method can minimize the consumption rate of the irrigation liquid.

Normally, the drip irrigation tube includes a tube provided with a plurality of through holes for discharging the irrigation liquid, and a plurality of emitters (also called "drippers") for discharging the irrigation liquid from the respective through holes (see, e.g., Patent Literature (hereinafter referred to as "PTL") 1).

The emitter disclosed in PTL 1 includes a first member having an intake port for intake of irrigation liquid, a second member having a discharging port for discharging the irrigation liquid, and a film member disposed between the first member and the second member. The configuration of the emitter is such that the first member, the film member, and the second member are stacked on one another in this order. The emitter is joined to the inner wall surface of the tube. In the emitter disclosed in PTL 1, the pressure of the irrigation liquid deforms the film member and causes the intake port to open, so that the irrigation liquid enters the emitter, flows through a pressure reducing channel between the intake port and the discharging port, and is discharged from the discharging port.

CITATION LIST

Patent Literature

PTL 1
Japanese Patent Application Laid-Open No. 2010-046094

SUMMARY OF INVENTION

Technical Problem

Meanwhile, drip irrigation tubes are long generally, and each have a plurality of emitters. For this reason, it is desirable that the emitters can be produced at low cost. In addition, the drip irrigation tubes may be disposed on or near the Earth's surface. For this reason, irrigation liquid in the drip irrigation tubes might be warmed to a high temperature (e.g., to as high as 40 to 50 degrees Celsius), which is higher than an expected temperature (e.g., 20 degrees Celsius).

Using a single general-purpose resin material (e.g., polyethylene or the like) to manufacture the emitter disclosed in PTL 1 allows cost saving in production to some extent. In the emitter manufactured of such a general-purpose resin material, however, when the temperature of the irrigation liquid exceeds the expected temperature, the film member is deformed more than expected, so that limitation on the discharge rate of the irrigation liquid might be started before the expected timing and the irrigation liquid cannot be discharged at a constant rate.

An object of the present invention is to provide an emitter which can discharge irrigation liquid at a constant rate even when the temperature of the irrigation liquid exceeds an expected temperature to some extent, and a drip irrigation tube including the emitter.

Solution to Problem

In order to solve the aforementioned problem, an emitter according to the present invention is configured to be joined to an inner wall surface of a tube for carrying irrigation liquid at a position corresponding to a discharging port of the tube for communicating between an inside and an outside of the tube, and configured to discharge the irrigation liquid in the tube at a constant rate out of the tube from the discharging port, the emitter being made of a resin, the emitter including: an intake part configured to communicate with a space in the tube when the emitter is joined to the tube; a pressure reducing channel part communicating with the intake part, and configured to form a pressure reducing channel for carrying the irrigation liquid while reducing a pressure of the irrigation liquid; a first flow rate adjusting part communicating with the pressure reducing channel part, and configured to adjust a flow rate of the irrigation liquid depending on a pressure of the irrigation liquid in the tube; a second flow rate adjusting part communicating with the pressure reducing channel part and the first flow rate adjusting part, and configured to adjust the flow rate of the irrigation liquid depending on the pressure of the irrigation liquid in the tube; and a discharging part communicating with the second flow rate adjusting part, and configured to face the discharging port when the emitter is joined to the tube. The first flow rate adjusting part includes: a first valve seat; a first communicating hole that opens at the first valve seat and that communicates with the second flow rate adjusting part; a first diaphragm part having flexibility and disposed away from the first valve seat, the first diaphragm part being configured to be brought close to the first valve seat when the pressure of the irrigation liquid in the tube is exerted on the first diaphragm part; and a valve element disposed between the first diaphragm part and an opening portion of the first communicating hole such that there is a gap between the valve element and the opening portion of the first communicating hole. The valve element is moved toward the first communicating hole as the first diaphragm part is brought close to the first valve seat, and wherein the valve element is of such a shape that, when a moving distance of the valve element is equal to or less than a predetermined value, the gap becomes narrower as the valve element is moved, and when the moving distance of the valve element is greater than the predetermined value, the gap becomes wider as the valve element is moved.

Moreover, in order to solve the aforementioned problem, a drip irrigation tube according to the present invention includes: a tube including a discharging port for discharging irrigation liquid; and the emitter according to the present invention that is joined to the inner wall surface of the tube at a position corresponding to the discharging port.

Advantageous Effects of Invention

According to the present invention, it is possible to discharge irrigation liquid at a desired discharge rate even when the temperature of the irrigation liquid exceeds an expected temperature to some extent.

DESCRIPTION OF EMBODIMENTS

Configuration of Drip Irrigation Tube

Figure 1A:
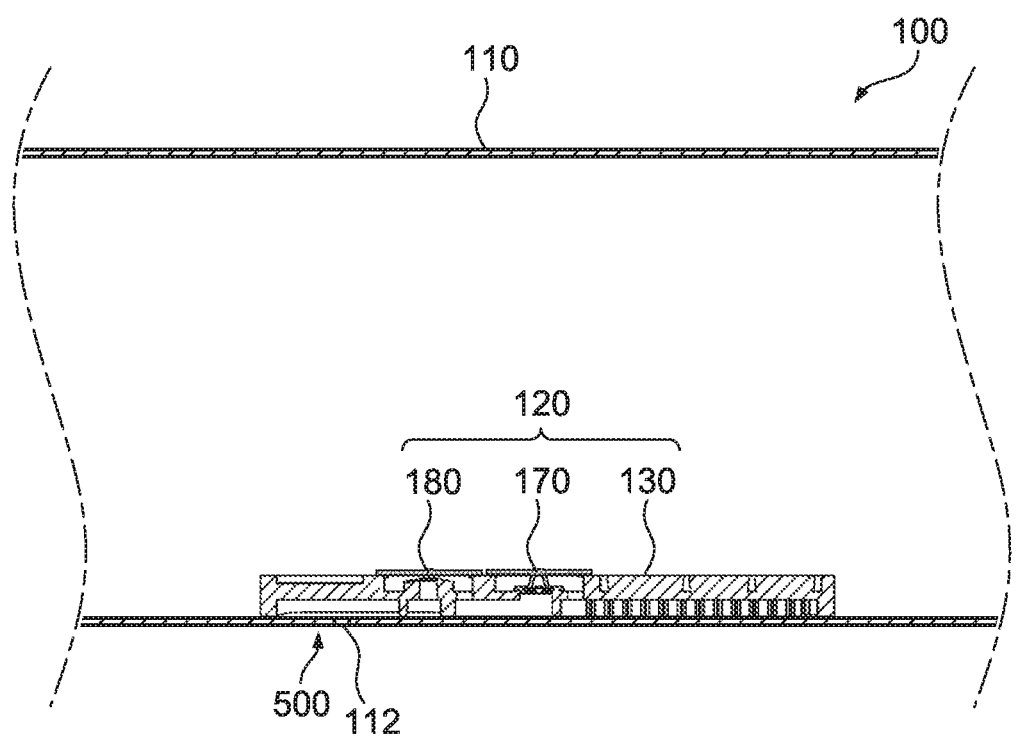
FIGS. 1A and 1B illustrate a configuration of a drip irrigation tube according to an embodiment of the present invention.
Figure 1B:
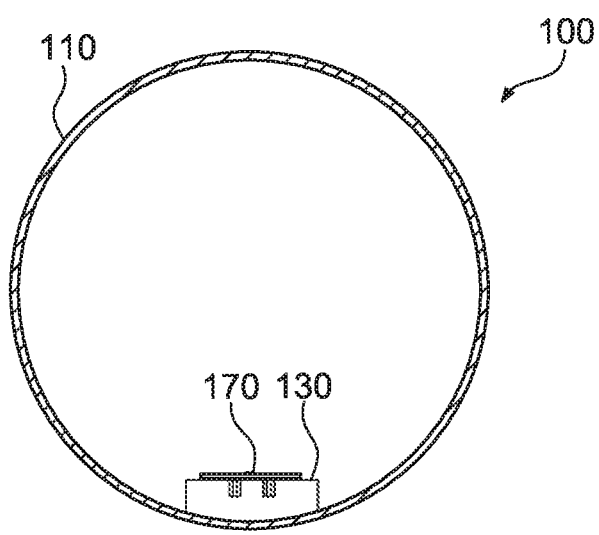

FIGS. 1A and 1B illustrate a configuration of drip irrigation tube 100 according to an embodiment of the present invention. FIG. 1A is a sectional view along the axial direction of drip irrigation tube 100 according to the present embodiment, and FIG. 1B is a sectional view perpendicular to the axial direction of drip irrigation tube 100. Drip irrigation tube 100 includes tube 110 including discharging port 112 for discharging irrigation liquid, and emitter 120 joined to the inner wall surface of tube 110 at a position corresponding to discharging port 112.

Tube 110 is a pipe for carrying irrigation liquid. Normally, tube 110 is made of a resin, and the material of tube 110 is, for example, polyethylene such as linear low-density polyethylene, high-density polyethylene, and/or the like. Tube 110 may have any size in the radial direction and any shape as long as emitter 120 can be disposed inside tube 110.

A plurality of discharging ports 112 for discharging irrigation liquid are formed in the wall of tube 110 at a predetermined interval (e.g., 200 mm to 500 mm) in the axial direction of tube 110. The opening portion of each of discharging ports 112 may have any diameter as long as the irrigation liquid can be discharged at a desired flow rate, and the diameter is, for example, 1.5 mm. A plurality of emitters 120 are joined to the inner wall surface of tube 110 at positions corresponding to discharging ports 112, respectively.

Each of emitters 120 is joined to the inner wall surface of tube 110. A joining method for joining emitter 120 to tube 110 is not particularly limited, and may be appropriately selected from well-known joining methods. Examples of the joining methods include welding or fusing of the resin material of emitter 120 or tube 110, and bonding with an adhesive agent.

Figure 2A:
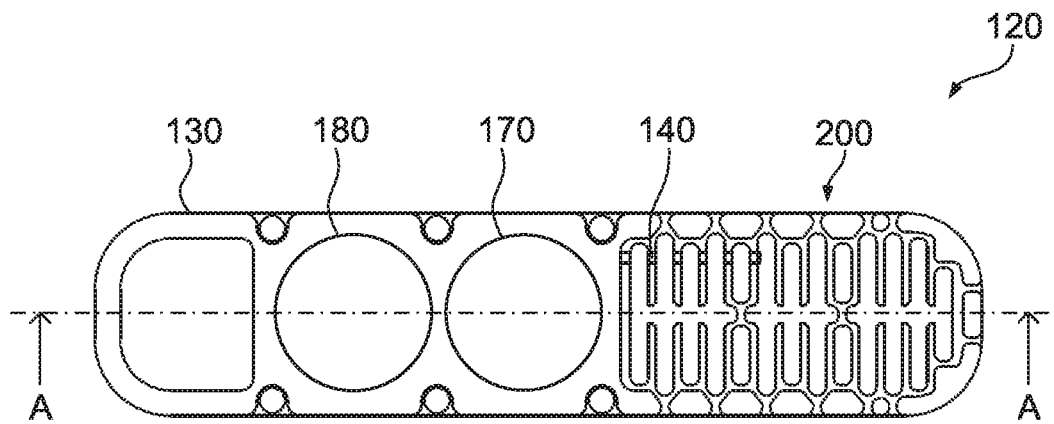
FIGS. 2A and 2B illustrate a configuration of an emitter according to the embodiment.
Figure 2B:
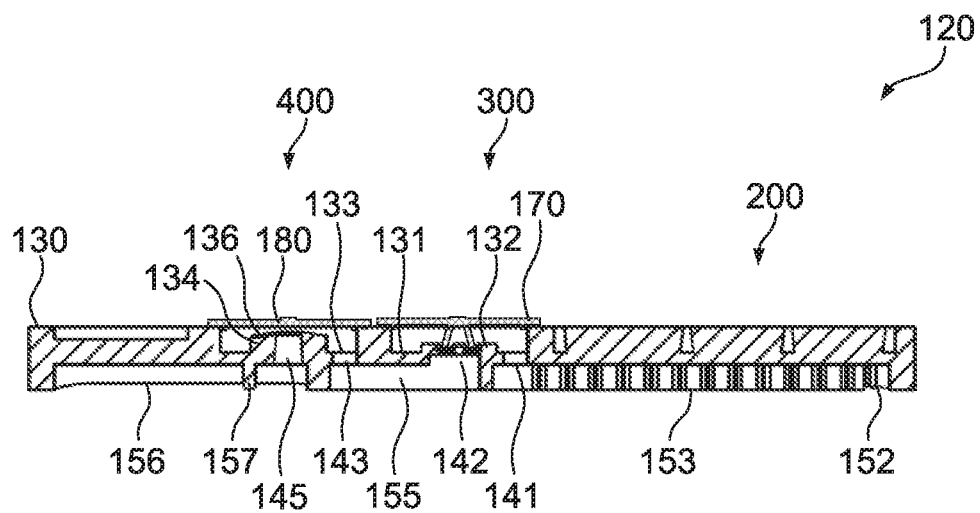

FIGS. 2A and 2B illustrate a configuration of emitter 120 according to the present embodiment. FIG. 2A is a plan view of emitter 120, and FIG. 2B is a sectional view of emitter 120 taken along line A-A in FIG. 2A.

The size and the shape of emitter 120 may be set appropriately as long as a desired function can be ensured. For example, emitter 120 in plan view has a substantially rectangular shape with rounded four corners, and emitter 120 has a long side length of 35 mm, a short side length of 8 mm, and a height of 2.5 mm Emitter 120 includes emitter main body 130, first diaphragm part 170, and second diaphragm part 180 as illustrated in FIGS. 2A and 2B. First diaphragm part 170 and second diaphragm part 180 may be disposed on emitter main body 130.

Figure 3A:
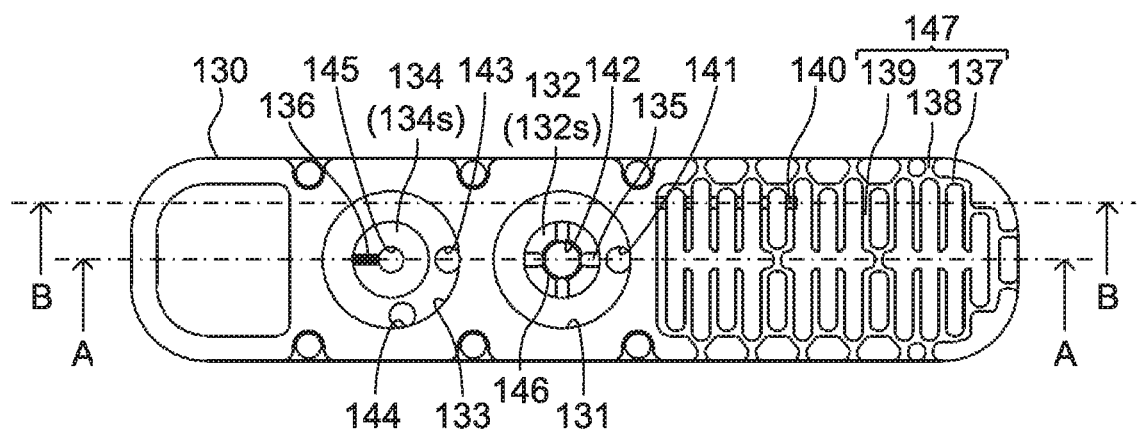
FIGS. 3A to 3D illustrate a configuration of an emitter main body.
Figure 3B:
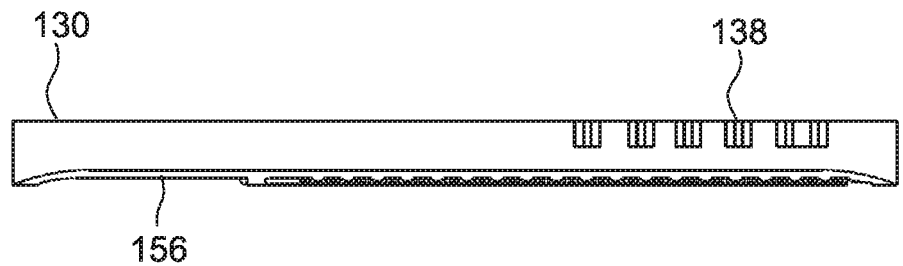
Figure 3C:
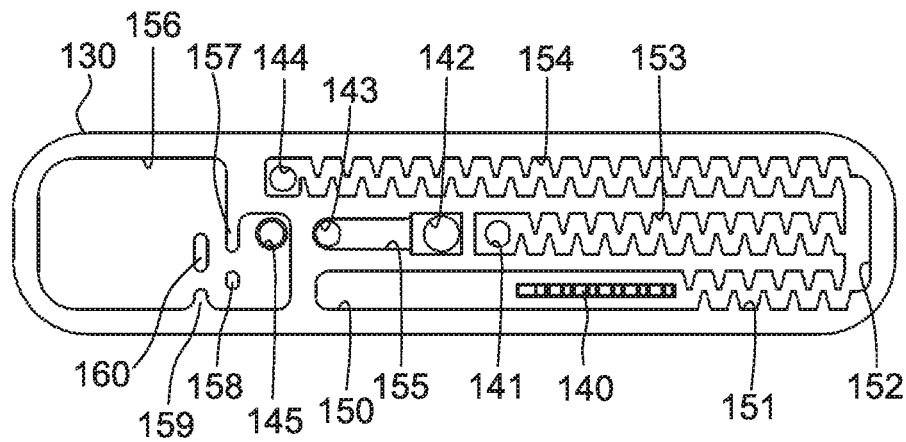
Figure 3D:
Figure 4A:
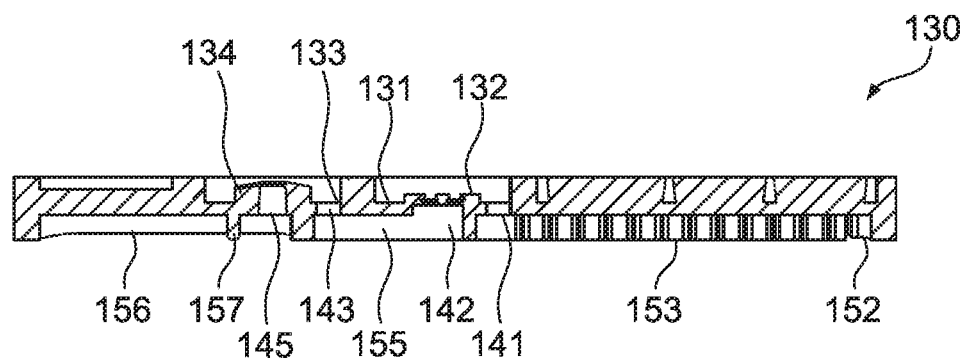
FIGS. 4A and 4B illustrate the configuration of the emitter main body.
Figure 4B:
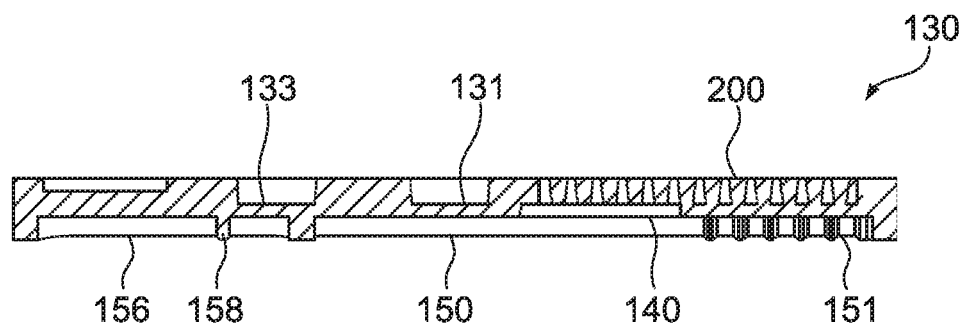

FIGS. 3A to 3D, 4A and 4B illustrate a configuration of emitter main body 130 according to the present embodiment. FIG. 3A is a plan view of emitter main body 130, FIG. 3B is a front view of emitter main body 130, FIG. 3C is a bottom view of emitter main body 130, and FIG. 3D is a right side view of emitter main body 130. FIG. 4A is a sectional view taken along line A-A in FIG. 3A, and FIG. 4B is a sectional view taken along line B-B in FIG. 3A.

Emitter main body 130 is molded from a resin material. Examples of the resin material include polyethylene such as linear low-density polyethylene, high-density polyethylene, and/or the like, polypropylene, silicone, and industrial materials having rubber elasticity. The examples of the industrial materials having rubber elasticity include elastomer and rubber.

Emitter main body 130 is substantially rectangular in plan view. The shape of bottom surface of emitter main body 130 is a curved surface that is convex to conform to the inner wall surface of tube 110. Recesses, grooves, protrusions, and through holes are appropriately disposed in the top surface and the bottom surface of emitter main body 130.

More specifically, first recess 131, first columnar part 132, second recess 133, second columnar part 134, first protrusions 135, first groove 136, second groove 137, third groove 138, and fourth groove 139 are formed in or on the top surface of emitter main body 130. Slit 140, first hole 141, second hole 142, third hole 143, fourth hole 144, and fifth hole 145 are further formed in emitter main body 130. Fifth groove 150, first pressure reducing channel part 151, sixth groove 152, second pressure reducing channel part 153, third pressure reducing channel part 154, seventh groove 155, and third recess 156 are further formed in or on the bottom surface of emitter main body 130.

First recess 131 opens in the central portion of the top surface of emitter main body 130. First columnar part 132 is disposed on the central portion of the bottom face of first recess 131. Second recess 133 opens in the top surface of emitter main body 130 on one outer side of first recess 131 in the longitudinal direction of emitter main body 130. Second columnar part 134 is disposed on the central portion of the bottom face of second recess 133. Both of first and second recesses 131 and 133 are circular in plan view. Second hole 142 opens in the top surface of first columnar part 132. First protrusions 135 are disposed on the top surface of first columnar part 132 to be spaced from one another and to surround the opening portion of second hole 142. Fifth hole 145 opens in the top surface of second columnar part 134. First groove 136 is formed in the top surface of second columnar part 134, and communicates between the rim of the top surface of second columnar part 134 and fifth hole 145. As described in detail below, second groove 137, third groove 138, and fourth groove 139 are formed in the top surface of emitter main body 130 on the other outer side of first recess 131 in the longitudinal direction of emitter main body 130.

The depth of first recess 131 (the distance from the top surface of emitter main body 130 to the bottom face of first recess 131) and the depth of second recess 133 (the distance from the top surface of emitter main body 130 to the bottom face of second recess 133) may be the same as each other or may be different from each other. The depths of first and second recesses 131 and 133 are the same as each other in the present embodiment.

First columnar part 132 protrudes from the bottom face of first recess 131, and second columnar part 134 protrudes from the bottom face of second recess 133. First columnar part 132 has a height less than the depth of first recess 131. Second columnar part 134 has a height less than the depth of second recess 133. The height of first columnar part 132 is lower than the height of second columnar part 134. The top surface of first columnar part 132 (first valve seat 132s) is planar, and the top surface of second columnar part 134 (second valve seat 134s) is sloping (curved). The shape of the opening portion of second hole 142 that opens in the central portion of the top surface of first columnar part 132 is circular, and the shape of the opening portion of fifth hole 145 that opens in the central portion of the top surface of second columnar part 134 is also circular. Accordingly, both of first and second columnar parts 132 and 134 are annular in plan view.

First groove 136 is formed in the top surface (second valve seat 134s) of second columnar part 134. One first groove 136 is provided in the present embodiment. First groove 136 is linear in plan view. First groove 136 has a fixed depth from the top surface of second columnar part 134, and has the bottom face parallel to this top surface.

First hole 141 opens in the bottom face of first recess 131. Second hole 142 opens in the central portion of first columnar part 132. As described in detail below, projection 146 protruding inward is formed over the entire circumference of the opening portion of second hole 142 in emitter main body 130. Third and fourth holes 143 and 144 open in the bottom face of second recess 133. Fifth hole 145 opens in the central portion of second columnar part 134. All the shapes of first, second, third, fourth, and fifth holes 141, 142, 143, 144, and 145 as seen in plan view are circular.

Emitter main body 130 also includes filter part 147 and slit 140 disposed in filter part 147. Filter part 147 and slit 140 are disposed on the other outer side of first recess 131 in the longitudinal direction of emitter main body 130.

Filter part 147 is microscopic protrusions and depressions formed on or in the top surface of emitter main body 130. Filter part 147 is composed of U-shaped second groove 137 extending along the edge of the longitudinal other end of emitter main body 130, a plurality of third grooves 138 extending outward from second groove 137 to communicate between second groove 137 and the outside, and a plurality of fourth grooves 139 extending inward from second groove 137. Fourth grooves 139 mainly extend along the transverse direction of emitter main body 130 independently of one another, but some of fourth grooves 139 communicate with each other.

Slit 140 is a through hole that opens in one end of emitter main body 130 in the transverse direction and that is elongated in the longitudinal direction of emitter main body 130. In the top surface of emitter main body 130, slit 140 opens at the bottoms of several of fourth grooves 139 of filter part 147.

Fifth groove 150 is formed in the bottom surface of emitter main body 130. Fifth groove 150 extends along the aforementioned longitudinal direction in the one end of emitter main body 130 in the transverse direction. First pressure reducing channel part 151 extends along the aforementioned longitudinal direction in the one end in the aforementioned transverse direction. One end of first pressure reducing channel part 151 communicates with one end of fifth groove 150. Sixth groove 152 extends along the aforementioned transverse direction in the other end of emitter main body 130 in the longitudinal direction. At inner portions of six groove 152 in the aforementioned longitudinal direction, sixth groove 152 communicates with the other end of first pressure reducing channel part 151, one end of second pressure reducing channel part 153, and one end of third pressure reducing channel part 154. Second pressure reducing channel part 153 extends along the aforementioned longitudinal direction in the central portion in the aforementioned transverse direction. Third pressure reducing channel part 154 extends along the aforementioned longitudinal direction in the other end in the aforementioned transverse direction. Seventh groove 155 extends along the aforementioned longitudinal direction in the central portion of bottom surface of emitter main body 130. Third recess 156 is formed in the bottom surface of emitter main body 130 on the outer side of fifth groove 150, seventh groove 155, and third pressure reducing channel part 154 in the aforementioned longitudinal direction.

Each of first, second, and third pressure reducing channel parts 151, 153, and 154 is a groove having a zigzag shape in plan view. The zigzag shape is a shape in which protrusions, each having a substantially triangular prism shape, are disposed on the both side surfaces of the pressure reducing channel part in a staggered manner along the longitudinal direction, for example. The protrusions as seen from the bottom surface of emitter main body 130 are disposed such that the tip of each protrusion does not cross the central axis between the both side surfaces, for example.

Slit 140 opens at the bottom face of fifth groove 150. First hole 141 opens at the other end of second pressure reducing channel part 153. Second hole 142 opens at one end of seventh groove 155, and third hole 143 opens at the other end of seventh groove 155. Fourth hole 144 opens at the other end of third pressure reducing channel part 154. Fifth hole 145 opens in the bottom face of third recess 156 on the inner side.

Third recess 156 is disposed to extend over the one outer end of the bottom surface of emitter main body 130. Third recess 156 includes second protrusion 157, third protrusion 158, fourth protrusion 159, and fifth protrusion 160.

Second protrusion 157 extends along the transverse direction, and is disposed at a position in alignment with the position of fifth hole 145 in the longitudinal direction. Third protrusion 158 is disposed at a position on the extension line of second protrusion 157 in the transverse direction such that third protrusion 158 is at distances from both of second protrusion 157 and the side wall of third recess 156. Fourth protrusion 159 extends from the side wall of third recess 156 along the transverse direction, and is disposed at a position in alignment with the gap between third protrusion 158 and the side wall of third recess 156 in the longitudinal direction. Fifth protrusion 160 extends along the extension line of fourth protrusion 159 in the transverse direction, and is disposed at a position in alignment with the gap between second protrusion 157 and the side wall of third protrusion 158 in the longitudinal direction.

Figure 5A:
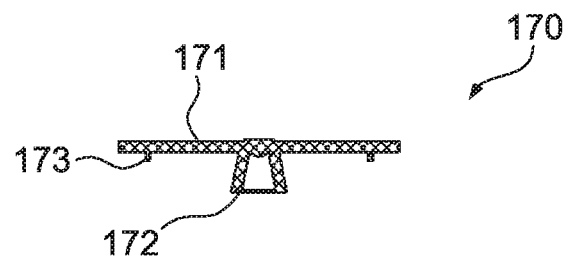
FIGS. 5A and 5B illustrate a configuration of a first diaphragm part.
Figure 5B:
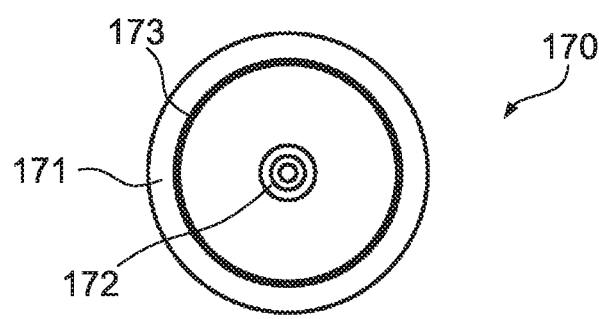
Figure 5C:
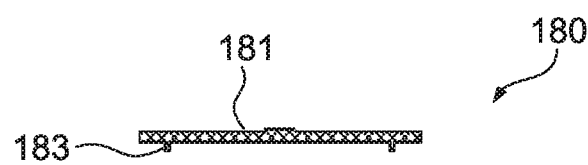
FIGS. 5C and 5D illustrate a configuration of a second diaphragm part.
Figure 5D:
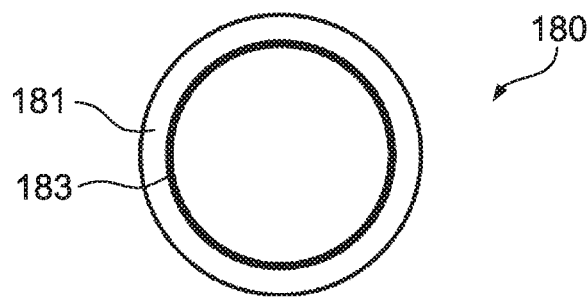

FIGS. 5A and 5B illustrate a configuration of first diaphragm part 170, and FIGS. 5C and 5D illustrate a configuration of second diaphragm part 180. FIG. 5A is a sectional view of first diaphragm part 170 along the central axis, and FIG. 5B is a bottom view of first diaphragm part 170. FIG.

5C is a sectional view of second diaphragm part 180 along the central axis, and FIG. 5D is a bottom view of second diaphragm part 180.

First diaphragm part 170 and second diaphragm part 180 are also made of a resin and have flexibility. Examples of the resin material include polyethylene such as linear low-density polyethylene, high-density polyethylene, and/or the like, polypropylene, silicone, and industrial materials having rubber elasticity. The examples of the industrial materials having rubber elasticity include elastomer and rubber. The resin material of first diaphragm part 170 may be identical to or different from that of emitter main body 130. The resin material of first diaphragm part 170 may also be identical to or different from that of second diaphragm part 180.

First diaphragm part 170 includes first film part 171 having a circular shape in plan view, valve element 172 extending from the central portion of first film part 171 in the direction of the normal to first film part 171, and first peripheral wall portion 173 extending from the periphery of first film part 171 in the direction the same as valve element 172. First peripheral wall portion 173 is disposed on the inner side of the outer edge portion of first film part 171. The diameter of first film part 171 is greater than the diameter of first recess 131, and the outer diameter of first peripheral wall portion 173 is equal to the diameter of first recess 131. A portion of first film part 171 on the outer side of first peripheral wall portion 173 and first peripheral wall portion 173 are disposed on emitter main body 130 to put the corner portion of the opening portion of first recess 131 between these portions. Accordingly, first diaphragm part 170 may be positioned reliably and easily to a desired position.

First diaphragm part 170 and valve element 172 are a one-piece part in the present embodiment. Valve element 172 has the external shape of a substantially conical frustum, and the diameter of valve element 172 in the section taken along the horizontal direction increases with increasing distance from first film part 171. When first diaphragm part 170 (first film part 171) is disposed to cover first recess 131, valve element 172 is disposed between first diaphragm part 170 and the opening portion of second hole 142 such that there is a gap between valve element 172 and second hole 142. Such a gap is the shortest distance between valve element 172 and the opening portion of second hole 142. As described in detail below, the size of the gap is appropriately set depending on a desired flow rate of the irrigation liquid that flows through the gap.

The height of valve element 172 (the distance between the base end and the front end of valve element 172) may be appropriately set depending on the depth of first recess 131, the height of first columnar part 132 (the position of second hole 142), and the depth of second hole 142. Valve element 172 is of such a height that the front end of valve element 172 can be disposed above the opening portion of second hole 142 with a desired gap between the front end of valve element 172 and the opening portion of second hole 142 when first diaphragm part 170 (first film part 171) is disposed to cover first recess 131. In addition, valve element 172 as seen from its bottom surface is circular, and the outer diameter of the protruding end portion of valve element 172 as seen in plan view is slightly smaller than the diameter of the opening portion of second hole 142. To be more specific, the outer diameter of the protruding end portion of valve element 172 is slightly smaller than the length of the diameter of the opening portion of second hole 142 minus twice the length of projection 146 in the protruding direction of projection 146 which protrudes inward from the entire circumference of the inner surface of second hole 142. The central portion of valve element 172 is an inverted conical hollow, and the thickness of the outer periphery wall of valve element 172 is substantially uniform.

Second diaphragm part 180 includes second film part 181 that is circular in plan view, and second peripheral wall portion 183 extending from the periphery of second film part 181 in the direction of the normal to second film part 181. Second peripheral wall portion 183 is disposed on the inner side of the outer edge portion of second film part 181. The diameter of second film part 181 is greater than the diameter of second recess 133, and the diameter of second peripheral wall portion 183 is equal to the diameter of second recess 133. A portion of second film part 181 on the outer side of second peripheral wall portion 183 and second peripheral wall portion 183 are disposed on emitter main body 130 to put the corner portion of the opening portion of second recess 133 between these portions. Accordingly, second diaphragm part 180 may be positioned reliably and easily to a desired position.

Emitter 120 is manufactured by fitting first diaphragm part 170 to first recess 131 internally such that valve element 172 and first peripheral wall portion 173 of first diaphragm part 170 face first recess 131 and by fitting second diaphragm part 180 to second recess 133 internally such that second peripheral wall portion 183 of second diaphragm part 180 faces second recess 133. Since both of the diaphragm parts include the peripheral wall portions and the portions of the film parts extending outside the peripheral wall portions as described above, the film parts of both of the diaphragm parts are disposed reliably and easily at positions at expected distances from the top surfaces (valve seats) of the columnar parts.

First and second diaphragm parts 170 and 180 are joined to emitter main body 130. Examples of the joining method include welding or fusing of the resin material, and bonding with an adhesive agent as described above.

Filter part 147, slit 140, and fifth groove 150 define intake part 200 that communicates with the interior of tube 110 when emitter 120 is joined to tube 110.

In addition, first recess 131, first columnar part 132, first protrusions 135 (referred to as "guide parts" in the appended claims), first hole 141, second hole (referred to as "first communicating hole" in the appended claims) 142, first diaphragm part 170 including valve part 172, and projection 146 form first flow rate adjusting part 300 for adjusting the flow rate of the irrigation liquid depending on the pressure of the irrigation liquid in tube 110 (see FIG. 2B). First flow rate adjusting part 300 communicates with second pressure reducing channel part 153 via first hole 141, and communicates with below-mentioned second flow rate adjusting part 400 via second hole 142, seventh groove 155, and third hole 143. The top surface of first columnar part 132 is first valve seat 132s to which first film part 171 of first diaphragm part 170 is brought closer. Second hole 142 opens at first valve seat 132s.

First film part 171 of first diaphragm part 170 has flexibility, is disposed away from first valve seat 132s, and is disposed and configured to be brought close to first valve seat 132s when the pressure of the irrigation liquid in tube 110 is exerted on first film part 171. First diaphragm part 170 includes valve element 172 disposed such that there is a gap between valve element 172 and the opening portion of second hole 142 in the present embodiment. More specifically, valve element 172 is disposed such that there is a gap between the protruding end portion of valve element 172 and projection 146. Valve element 172 is moved toward second hole 142 as first diaphragm part 170 (first film part 171) is brought close to first valve seat 132s. Valve element 172 is of such a shape that, when the moving distance of valve element 172 is equal to or less than a predetermined value, the gap, which is the shortest distance between valve element 172 and the opening portion of second hole 142 becomes narrower as valve element 172 is moved, and when the moving distance of valve element 172 is greater than the predetermined value, the gap becomes wider as valve element 172 is moved (valve element 172 has the shape of an inverted conical frustum in the present embodiment).

Here, the predetermined value is decided based on the length of the gap between the protruding end portion of valve element 172 and projection 146 of second hole 142. To be more specific, the predetermined value is the moving distance of valve element 172 through which valve element 172 is moved until the gap between the protruding end portion of valve element 172 and projection 146 of second hole 142 is the smallest, when valve element 172 is moved toward second hole 142. The predetermined value is the moving distance through which valve element 172 is moved until the aforementioned gap is substantially zero.

First protrusions 135 function as a guide for valve element 172 being moved toward second hole 142. Since valve element 172 is disposed such that there is a gap between valve element 172 and the opening portion of second hole 142, valve element 172 can be moved suitably toward the opening portion of second hole 142 by first protrusions 135 (guide parts) guiding valve element 172 to second hole 142. The sizes, the shape, and the number of first protrusions 135 may be appropriately determined as long as first protrusions 135 can exhibit the aforementioned function. For example, a plurality of first protrusions 135 are provided, and the plurality of first protrusions 135 are disposed on the valve-element-172 side to surround the opening portion of second hole 142 and to be spaced from one another. The irrigation liquid can flow between adjacent first protrusions 135. Four first protrusions 135 are provided in the present embodiment. Four first protrusions 135 are disposed along two straight lines running through the center of second hole 142 and being orthogonal to each other. In addition, it is preferable, from the viewpoint of ease of the movement of valve element 172, that the contact areas between valve element 172 and first protrusions 135 are small. In this viewpoint, it is preferable that the shapes of portions of first protrusions 135 coming into contact with valve element 172 be curved surfaces.

Projection 146 protrudes from the inner surface of second hole 142 in the direction orthogonal to the moving direction of valve element 172 over the entire circumference of the opening portion of second hole 142. Projection 146 is also of such a shape that, when the moving distance of valve element 172 is equal to or less than the predetermined value, the aforementioned gap becomes narrower as valve element 172 is moved, and when the moving distance of valve element 172 is greater than the predetermined value, the gap becomes wider as valve element 172 is moved. For the purpose of making shorter the time until the aforementioned gap begins to become wider after the gap became narrow when valve element 172 is moved toward second hole 142, it is preferable that the length of projection 146 in the moving direction of valve element 172 be short. Meanwhile, from the viewpoint of ease of resin filling for projection 146 at the time of producing emitter main body 130 by injection molding, it is preferable that the length of projection 146 in the moving direction of valve element 172 be long to some extent. The sectional shape of projection 146 in the plane extending along the moving direction of valve element 172 is a right angled triangle shape or an isosceles triangle shape, for example.

Further, second recess 133, second columnar part 134, third hole 143, fourth hole 144, fifth hole (referred to as "second communicating hole" in the appended claims) 145, first groove 136, and second diaphragm part 180 form second flow rate adjusting part 400 for adjusting the flow rate of the irrigation liquid depending on the pressure of the irrigation liquid in tube 110 (see FIG. 2B). Second flow rate adjusting part 400 communicates with third pressure reducing channel part 154 via fourth hole 144, communicates with first flow rate adjusting part 300 via third hole 143, seventh groove 155, and second hole 142, and communicates with below-mentioned discharging part 500 via fifth hole 145. The top surface of second columnar part 134 is second valve seat 134s on which second film part 181 of second diaphragm part 180 can sit. Fifth hole 145 opens at second valve seat 134s. Second diaphragm part 180 has flexibility, is disposed away from second valve seat 134s, and is brought close to second valve seat 134s when the pressure of the irrigation liquid in tube 110 is exerted on second diaphragm part 180.

As described above, emitter 120 is joined to the inner wall surface of tube 110 at the bottom surface of emitter main body 130. In this manner, drip irrigation tube 100 as illustrated in FIGS. 1A and 1B is produced. Discharging port 112 may be formed in advance in tube 110 before emitter 120 is joined, or may be formed after emitter 120 is joined.

The recesses and the grooves formed in the bottom surface of emitter main body 130 are covered by the inner wall surface of tube 110, so that discharging part 500 and the channels for the irrigation liquid inside emitter 120 are formed. Specifically, first pressure reducing channel part 151, second pressure reducing channel part 153, and third pressure reducing channel part 154 communicate with intake part 200, and form a first pressure reducing channel, a second pressure reducing channel, and a third pressure reducing channel, respectively, each of which is configured to carry the irrigation liquid while reducing the pressure of the irrigation liquid. Sixth groove 152 forms a branch channel branching from the first pressure reducing channel to the second and the third pressure reducing channels, and seventh groove 155 forms a communicating channel for supplying, to second flow rate adjusting part 400, irrigation liquid from first flow rate adjusting part 300. In addition, third recess 156 forms discharging part 500 communicating with second flow rate adjusting part 400 and facing discharging port 112.

Flow of Irrigation Liquid

An overview of flow of irrigation liquid in drip irrigation tube 100 is described. The irrigation liquid supplied in tube 110 flows through the grooves (second, third, and fourth grooves 137, 138, and 139) and slit 140 of filter part 147, and is supplied to fifth groove 150. The irrigation liquid is water, liquid fertilizer, agricultural chemical, or mixed liquid of two or more of them, for example. The floating matters in the irrigation liquid are not allowed to enter the grooves in filter part 147, and accordingly the irrigation liquid from which the floating matters are removed is supplied to fifth groove 150 via slit 140.

The irrigation liquid supplied to groove 150 is supplied to the branch channel through the first pressure reducing channel (first pressure reducing channel part 151) while the pressure of the irrigation liquid is reduced. Part of the irrigation liquid supplied to the branch channel is supplied to first flow rate adjusting part 300 through the second pressure reducing channel (second pressure reducing channel part 153) while the pressure of the irrigation liquid is further reduced. Then, this part of the irrigation liquid is supplied to second flow rate adjusting part 400 via the communicating channel (seventh groove 155). Moreover, the rest of the irrigation liquid supplied to the branch channel (sixth groove 152) is supplied to second flow rate adjusting part 400 through third pressure reducing channel (third pressure reducing channel part 154) while the pressure of the irrigation liquid is further reduced. The irrigation liquid supplied to second flow rate adjusting part 400 is supplied to discharging part 500 at a flow rate which is adjusted depending on the liquid pressure of the irrigation liquid in tube 110, and discharged from discharging port 112. Hereinafter, a channel including intake part 200, the first pressure reducing channel (first pressure reducing channel part 151), the second pressure reducing channel (second pressure reducing channel part 153), first flow rate adjusting part 300, second flow rate adjusting part 400, and discharging part 500 is referred to as "first channel" In addition, a channel including intake part 200, the first pressure reducing channel (first pressure reducing channel part 151), the third pressure reducing channel (third pressure reducing channel part 154), second flow rate adjusting part 400, and discharging part 500 is referred to as "second channel."

When drip irrigation tube 100 is in use, foreign matters such as soil and plant roots might enter drip irrigation tube 100 from discharging port 112. Entry of the foreign matters is obstructed by fourth and fifth protrusions 159 and 160 disposed in third recess 156, and further by second and third protrusions 157 and 158 disposed on the fifth-hole-145 side in third recess 156. It is thus possible to prevent variation in flow rate such as stoppage of discharging of the irrigation liquid, reduction in flow rate of the irrigation liquid, and/or the like due to the entry of the foreign matters.

Control of Discharge Rate

Figure 6A:
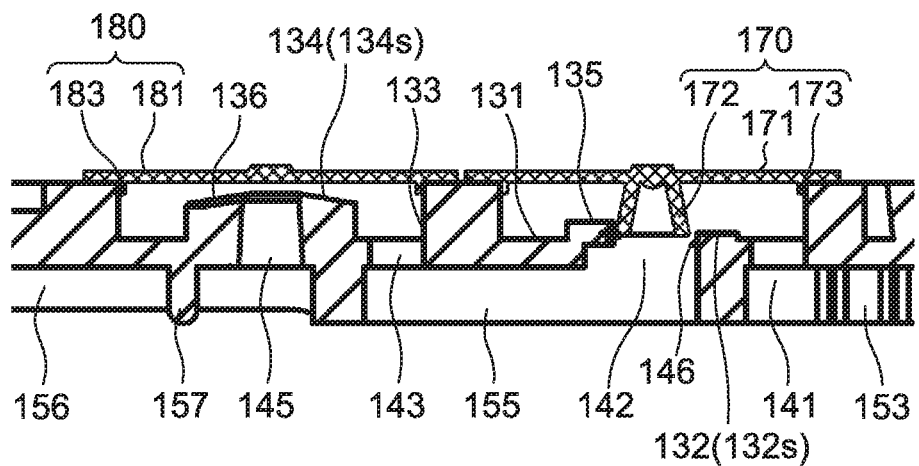
FIGS. 6A to 6C are partly enlarged sectional views for describing a control of a discharge rate of irrigation liquid by an emitter.
Figure 6B:
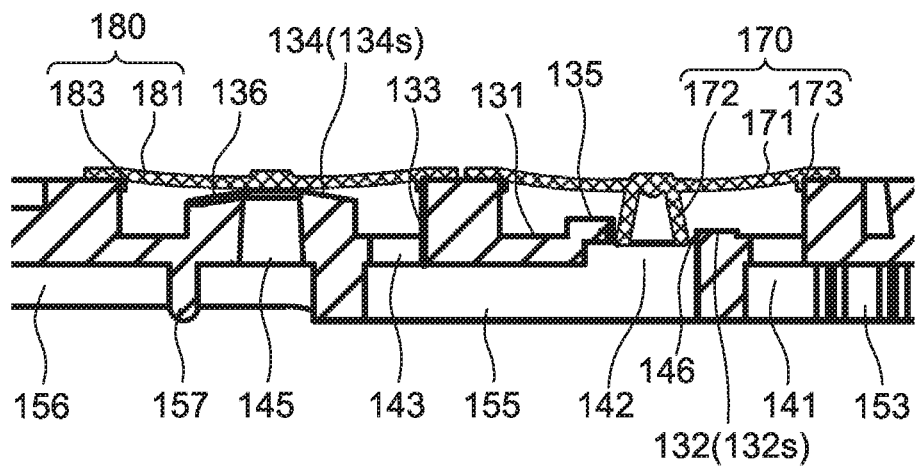
Figure 6C:
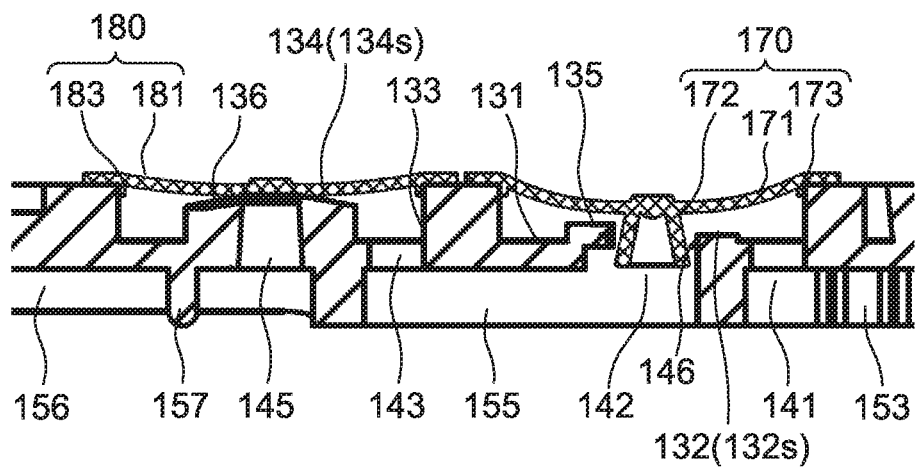

Next, a description will be given of a control of the discharge rate of the irrigation liquid by emitter 120. To begin with, a description will be given of a control of the discharge rate of the irrigation liquid at normal temperature (e.g., 20 degrees Celsius). FIGS. 6A to 6C are partly enlarged sectional views for describing the control of the discharge rate of the irrigation liquid by emitter 120. FIG. 6A is a sectional view schematically illustrating the states of first and second flow rate adjusting parts 300 and 400 of emitter 120 under a condition of no pressure or under a condition an extremely low pressure, FIG. 6B is a sectional view schematically illustrating the states of first and second flow rate adjusting parts 300 and 400 of emitter 120 under a condition of low pressure, and FIG. 6C is a sectional view schematically illustrating first and second flow rate adjusting parts 300 and 400 of emitter 120 under a condition of moderate to high pressure. Note that, the illustration of first protrusion 135 on the first-hole-141 side is omitted in FIGS. 6A to 6C.

Under Condition of Normal Temperature and No Pressure

When the temperature of the irrigation liquid is normal and the liquid pressure of the irrigation liquid is 0 MPa, the irrigation liquid does not flow inside emitter 120 and, therefore, no pressure difference (differential pressure) between the inside and the outside of emitter 120 is caused. Therefore, neither of first and second diaphragm parts 170 and 180 are deformed (see FIG. 6A).

Under Condition of Normal Temperature and Extremely Low Pressure

When the temperature of the irrigation liquid is normal and the liquid pressure of the irrigation liquid is extremely low (e.g., as low as 0.005 MPa) (under the condition of normal temperature and an extremely low pressure), the irrigation liquid flows both inside tube 110 and inside emitter 120.

In first flow rate adjusting part 300, a differential pressure is caused between, on the one hand, the pressure of the irrigation liquid inside tube 110 outside emitter 120 (external liquid pressure) and, on the other hand, the pressure of the irrigation liquid in first recess 131 (internal liquid pressure). The internal liquid pressure in first flow rate adjusting part 300 is lower than the external liquid pressure because of the pressure drop in the first and the second pressure reducing channels. An increase in external liquid pressure typically causes the aforementioned differential pressure in first flow rate adjusting part 300 to increase.

Also in second flow rate adjusting part 400, a differential pressure is caused between, on the one hand, the pressure of the irrigation liquid inside tube 110 outside emitter 120 (external liquid pressure) and, on the other hand, the pressure of the irrigation liquid in second recess 133 (internal liquid pressure). The internal liquid pressure in second flow rate adjusting part 400 is lower than the external liquid pressure because of the pressure drop in the first and the third pressure reducing channels and first flow rate adjusting part 300. The aforementioned differential pressure in second flow rate adjusting part 400 is determined by the pressure drop by the first pressure reducing channel, the pressure drop by the third pressure reducing channel, and the pressure drop in first flow rate adjusting part 300.

Since the differential pressure between the inside and outside of emitter 120 is small under the condition of normal temperature and an extremely low pressure, neither of first and second diaphragm parts 170 and 180 are deformed (see FIG. 6A). As described above, the gap is formed between valve element 172 and projection 146 in second hole 142 in first flow rate adjusting part 300. For this reason, the irrigation liquid can flow through the gap under the condition of normal temperature and an extremely low pressure. The irrigation liquid taken in from intake part 200 is discharged out of tube 110 from discharging port 112 through both of the first and the second channels.

Under Condition of Normal Temperature and Low Pressure

When the temperature of the irrigation liquid is normal and the liquid pressure of the irrigation liquid is low (e.g., as low as 0.02 MPa) (under the condition of normal temperature and a low pressure), the aforementioned differential pressure causes first diaphragm part 170 to bend as illustrated in FIG. 6B. Note that, FIG. 6B illustrates the state where the moving distance of the valve element equals to a predetermined value, that is, the state where the gap between the protruding end portion of valve element 172 and projection 146 of second hole 142 is the shortest. When first diaphragm part 170 bends, valve element 172 is moved toward second hole 142 along first protrusions 135. Valve element 172 is moved such that the aforementioned gap becomes narrower as the moving distance of valve element 172 approaches the predetermined value. Accordingly, the pressure drop of the irrigation liquid by the gap increases in first flow rate adjusting part 300 as the moving distance of valve element 172 approaches the predetermined value. That is, the flow rate of the irrigation liquid that flows through the aforementioned gap decreases. When the moving distance of valve element 172 equals to the predetermined value, the pressure drop of the irrigation liquid by the gap is the maximum.

Second diaphragm part 180 of second flow rate adjusting part 400 bends due to the differential pressure as illustrated in FIG. 6B, and is brought closer to the top surface (second valve seat 134s) of second columnar part 134 as the pressure of irrigation liquid becomes higher. Thus, the gap between the opening portion of fifth hole 145 and second diaphragm part 180 becomes small. Consequently, the flow rate of the irrigation liquid to be discharged from discharging port 112 is adjusted.

Under Condition of Normal Temperature and Moderate to High Pressure

When the temperature of the irrigation liquid is normal and the liquid pressure of the irrigation liquid is moderate to high (e.g., 0.1 MPa) (under the condition of normal temperature and a moderate to high pressure), the aforementioned differential pressure causes first diaphragm part 170 to bend largely as illustrated in FIG. 6C. When first diaphragm part 170 bends largely, valve element 172 is moved further toward second hole 142. Valve element 172 is moved such that the aforementioned gap becomes wider as the moving distance of valve element 172 becomes greater than the predetermined value. Accordingly, the pressure drop of the irrigation liquid by the gap decreases in first flow rate adjusting part 300 as the moving distance of valve element 172 becomes greater than the predetermined value. Accordingly, the internal liquid pressure of second flow rate adjusting part 400 increases.

In addition, second diaphragm part 180 also bends largely because of the differential pressure between the aforementioned external liquid pressure and internal liquid pressure as illustrated in FIG. 6C, so as to be brought into contact with the top surface (second valve seat 134s) of second columnar part 134. At this time, fifth hole 145 communicates with second circular recess 133 via first groove 136. Under the condition of normal temperature and a moderate to high pressure, the irrigation liquid is discharged from discharging port 112 at a predetermined flow rate that is determined by the internal liquid pressure of second flow rate adjusting part 400 and first groove 136.

Next, the control of the discharge rate of the irrigation liquid by emitter 120 at high temperature (e.g., 40 to 50 degrees Celsius) is described.

Under Condition of High Temperature and No Pressure

When the temperature of the irrigation liquid is high and the liquid pressure of the irrigation liquid is 0 MPa, no pressure difference is caused between the inside and the outside of emitter 120 since the irrigation liquid does not flow inside emitter 120 as in the case of the condition of normal temperature and no pressure described above, and therefore, neither of first and second diaphragm parts 170 and 180 are deformed.

Under Condition of High Temperature and Extremely Low Pressure

When the temperature of the irrigation liquid is high and the liquid pressure of the irrigation liquid is extremely low (e.g., as low as 0.005 MPa) (under the condition of high temperature and an extremely low pressure), the irrigation liquid flows both inside tube 110 and inside emitter 120.

Since the differential pressure between the inside and outside of emitter 120 is small under the condition of high temperature and an extremely low pressure, neither of first and second diaphragm parts 170 and 180 are deformed. As in the case of normal temperature and an extremely low pressure, the irrigation liquid can flow through the gap between valve element 172 and projection 146 of second hole 142 in first flow rate adjusting part 300. The irrigation liquid taken in from intake part 200 is discharged out of tube 110 from discharging port 112 through both of the first and the second channels.

Under Condition of High Temperature and Low Pressure

When the temperature of the irrigation liquid is high and the liquid pressure of the irrigation liquid is low (e.g., 0.02 MPa) (under the condition of high temperature and a low pressure), both of first and second diaphragm parts 170 and 180 are deformed because of the differential pressure. It should be noted that, since both of first and second diaphragm parts 170 and 180 are made of a resin as described above, first and second diaphragm parts 170 and 180 are deformed more largely under the condition of high temperature and a low pressure than under the condition of normal temperature and a low pressure.

Accordingly, first diaphragm part 170 bends more largely under the condition of high temperature and a low pressure than under the condition of normal temperature and a low pressure. Therefore, the differential pressure at which the moving distance of valve element 172 reaches the predetermined value is lower under the condition of high temperature and a low pressure than under the condition of normal temperature and a low pressure. Since second diaphragm part 180 is also deformed more largely under the condition of high temperature and a low pressure than under the condition of normal temperature and a low pressure, second diaphragm part 180 is brought close to the top surface (second valve seat 134s) of second columnar part 134 at a lower differential pressure under the condition of high temperature and a low pressure. The flow rate of the irrigation liquid is adjusted also under the condition of high temperature and a low pressure as with the case of the condition of normal temperature and a low pressure.

Under Condition of High Temperature and Moderate to High Pressure

First diaphragm part 170 is deformed more largely under the condition of high temperature and a moderate to high pressure than under the condition of normal temperature and a moderate to high pressure. For this reason, valve element 172 is inserted beyond the predetermined value into second hole 142 at a lower differential pressure. Accordingly, the pressure drop in first flow rate adjusting part 300 is smaller than under the condition of normal temperature and a moderate to high pressure.

Second diaphragm part 180 is also deformed more largely under the condition of high temperature and a moderate to high pressure than under the condition of normal temperature and a moderate to high pressure. However, regarding pressure drops caused on the upstream side of second flow rate adjusting part 400, part of the pressure drops caused by first flow rate adjusting part 300 is smaller under the condition of high temperature and a moderate to high pressure than under the condition of normal temperature and a moderate to high pressure as described above. Accordingly, the internal liquid pressure in second flow rate adjusting part 400 is higher and the differential pressure at second flow rate adjusting part 400 is lower under the condition of high temperature and a moderate to high pressure than under the condition of normal temperature and a moderate to high pressure.

Consequently, the deformation of second diaphragm part 180 is reduced, so that second diaphragm part 180 is deformed under the condition of high temperature and a moderate to high pressure only as much as under the condition of normal temperature and a moderate to high pressure. Therefore, the size of the gap between the opening portion of fifth hole 145 and second diaphragm part 180 is as large even under the condition of high temperature and a moderate to high pressure as the size of the gap under the condition of normal temperature and a moderate to high pressure, so that the irrigation liquid is discharged from discharging port 112 at a flow rate substantially equal to the flow rate of the irrigation liquid under the condition of normal temperature and a moderate to high pressure.

With emitter 120 designed such that the differential pressures under the high temperature conditions are substantially equal to the differential pressures under the normal temperature conditions, the extent of movements of second flow rate adjusting part 400 for adjusting the flow rate can be similarly set between the conditions of the same pressure and of different temperatures. Accordingly, the flow rate of the irrigation liquid from discharging port 112 under the high temperature conditions is substantially the same as the flow rate of the irrigation liquid under the normal temperature conditions. Moreover, valve element 172 is disposed between first diaphragm part 170 and the opening portion of second hole 142 such that there is the gap between valve element 172 and the opening portion of second hole 142 in the present embodiment. This can cause the irrigation liquid to be discharged from discharging port 112 even when the pressure of the irrigation liquid flowing into tube 110 is extremely low.

Effect

Emitter 120 according to the present embodiment includes the pressure reducing channel parts (first pressure reducing channel part 151, second pressure reducing channel part 153, and third pressure reducing channel part 154), first flow rate adjusting part 300, and second flow rate adjusting part 400. In addition, valve element 172 is disposed between first diaphragm part 170 and the opening portion of second hole 142 such that there is the gap between valve element 172 and the opening portion of second hole 142. Valve element 172 is of such a shape that, when the moving distance of valve element 172 is equal to or less than the predetermined value, the aforementioned gap becomes narrower as valve element 172 is moved, and when the moving distance of valve element 172 is greater than the predetermined value, the gap becomes wider as valve element 172 is moved. Therefore, in the present embodiment as compared to the case where valve element 172 is disposed between first diaphragm part 170 and the opening portion of second hole 142 without a gap between valve element 172 and the opening portion of second hole 142, the irrigation liquid can flow through the aforementioned gap to be discharged from discharging port 112 even when the pressure of the irrigation liquid flowing into tube 110 is extremely low.

Moreover, when the moving distance of valve element 172 is greater than the predetermined value, the pressure drop at first flow rate adjusting part 300 can be reduced as first diaphragm part 170 in first flow rate adjusting part 300 is deformed largely and valve element 172 is moved. This reduction of the pressure drop brings about an increase in internal liquid pressure at second flow rate adjusting part 400, resulting in mitigation of the limitation on the flow rate at second flow rate adjusting part 400. Accordingly, the discharge rate of emitter 120 is controlled at a desired rate regardless of the temperature even under the moderate- to high-pressure conditions where the deformation amounts of diaphragm parts 170 and 180 tend to vary greatly depending on the external liquid pressure. Thus, even when the temperature of the irrigation liquid is high to some extent, emitter 120 can discharge the irrigation liquid at a desired discharge rate irrespective of the temperature. Since drip irrigation tube 100 includes emitter 120, drip irrigation tube 100 similarly can discharge the irrigation liquid at a desired discharge rate irrespective of the temperature even when the temperature of the irrigation liquid is high to some extent.

Figure 7A:
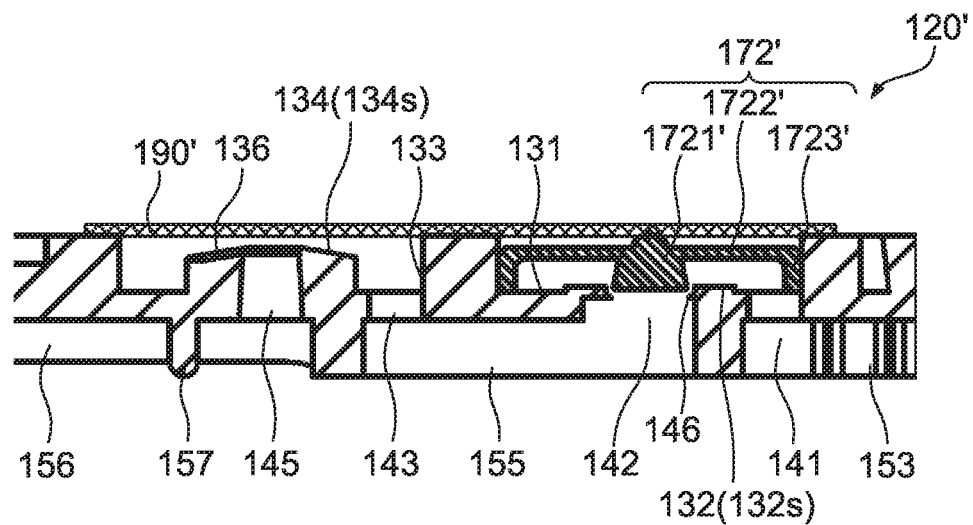
FIG. 7A is a partly enlarged sectional view of a configuration of an emitter according to a modification.
Figure 7B:
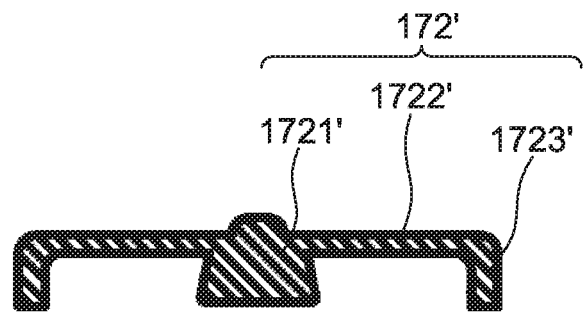
FIGS. 7B and 7C illustrate a configuration of a valve part included in the emitter according to the modification.
Figure 7C:
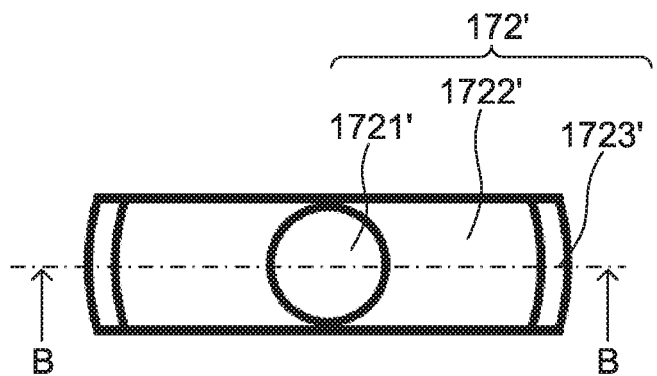

Note that, although the present embodiment has been described in which first diaphragm part 170 and valve element 172 are a one-piece part, first diaphragm part 170 and valve element 172 may also be separate parts. FIG. 7A is a partly enlarged sectional view of a configuration of emitter 120' according to a modification, and FIGS. 7B and 7C illustrate a configuration of valve part 172' included in emitter 120' according to the modification. FIG. 7B is a sectional view taken along line B-B in FIG. 7C, and FIG. 7C is a bottom view of valve part 172'.

Emitter 120' according to the modification includes emitter main body 130 and film 190' disposed on emitter main body 130 as illustrated in FIG. 7A. A method of joining emitter main body 130 to film 190' is not limited particularly. Examples of the method of joining emitter main body 130 to film 190' include welding of the resin material of film 190', bonding with an adhesive agent, and/or the like.

Valve part 172' according to the modification includes valve element 1721', connecting portion 1722', and leg portions 1723'. Valve element 1721' is disposed such that there is a gap between the protruding end portion of valve element 1721' and projection 146 also in the modification. The shape of valve element 1721' is the same as valve element 172 of the aforementioned embodiment except that the central portion of valve element 1721' is not an inverted conical hollow. Connecting portion 1722' connects valve element 1721' to leg portions 1723'. Leg portions 1723' position valve part 172' such that the position of valve element 1721' is not shifted by the irrigation liquid in first recess 131 of emitter 120'. Leg portions 1723' are upright protrusions extending from the outer edge portion of connecting portion 1722' in the present modification. The shapes of connecting portion 1722' and leg portions 1723' are not limited particularly as long as the above-described functions can be ensured. Connecting portion 1722' is substantially rectangular in plan view in the present modification. Leg portions 1723' have an outwardly convex columnar shape formed such that leg portions 1723' are in contact with the inner wall surface of first recess 131.

In addition, first and second diaphragm parts 170 and 180 are a one-piece part, and are formed as film 190' of a simple configuration in the present modification. As understood, the first and the second diaphragm parts can be formed as simple film 190' by forming first diaphragm part 170 and valve element 172' as separate parts. Consequently, it is possible to simplify the configuration of emitter 120' to achieve cost reduction.

Note also that, although the embodiment of the present invention has been described in which the resin material of first diaphragm part 170 is the same as the resin material of second diaphragm part 180, the resin material of first diaphragm part 170 may also be different from the resin material of second diaphragm part 180. For example, first diaphragm part 170 may be made of a resin material that is curved more largely at high temperature than the resin material of second diaphragm part 180. Such resin materials make it possible to further reduce the difference between the discharge rate of the irrigation liquid at normal temperature and the discharge rate of the irrigation liquid at high temperature under the moderate- to high-pressure conditions.

In the case where first diaphragm part 170 and second diaphragm part 180 are made of the same resin material, second diaphragm part 180 comes into contact with the top surface of second columnar part 134s more easily under higher temperature provided that first and second diaphragm parts 170 and 180 are under the same pressure. In the case where the temperature dependency of the deformation of second diaphragm part 180 is lower than that of first diaphragm part 170, the timing at which second diaphragm part 180 comes into contact with second columnar part 134 at high temperature can be delayed. Consequently, even at high temperature, second diaphragm part 180 can be configured to come into contact with the top surface of second columnar part 134 at the timing the same as or similar to the timing in the case of normal temperature. This is much more effective from a viewpoint of an easier and more precise design.

The bending property of the resin material depending on temperature change can be set by determining the bending elastic modulus of the resin material in the assumed temperature range of the irrigation liquid, for example. The bending elastic modulus can be determined based on publicly known standards such as JIS K7171:2008 (ISO 178: 2001) or JIS K7127:1999 (ISO 527-3:1995), for example.

For example, the resin materials of diaphragm parts 170 and 180, the thicknesses of film parts 171 and 181, and the external shape of valve element 172 can be determined based on the relationship between, on the one hand, the deformation of first diaphragm part 170 under the aforementioned liquid pressure and, on the other hand, the variation in size of the gap between second hole 142 and valve element 172, based on the relationship between the increase in the aforementioned liquid pressure and the decrease in the distance from second diaphragm part 180 (second film part 181) to the top surface of second columnar part 134 at the time of the increase in the liquid pressure, and/or the like, and the above-mentioned relationships can be calculated by computer simulations, determined by experiments using trial products, and/or the like, for example.

The external shape of valve element 172 is not limited to an inverted conical frustum. For example, the cross-sectional shape of valve element 172 along the horizontal direction may be a polygonal shape, or a noncircular shape such as an elliptical shape. In addition, the external shape of valve element 172 in the vertical section may be a temple-bell shape (a shape gradually expanding along the extension of valve element 172 in the axial direction (height direction) of the valve element 172 and having outwardly convex curves), or, conversely, a shape gradually expanding along the extension of valve element 172 in the axis direction (moving direction) of the valve element 172 and having concave curves that are concave with respect to the outside.

In addition, a so-called wedge wire structure in which the side walls of second to fourth grooves 137, 138, and 139 in filter part 147 are formed to include undercut portions is preferable since such a structure is further advantageous in reducing the pressure drop and clogging at filter part 147.

The present patent application claims the benefit of priority based on Japanese Patent Application No. 2016-184380 filed on Sep. 21, 2016. The disclosure of the specification, drawings and abstract of the Japanese Patent Application is incorporated in the specification of the present application by reference in its entirety.

INDUSTRIAL APPLICABILITY

According to the present invention, it is possible to provide, with high productivity, an emitter which can drop irrigation liquid with an appropriate rate depending on the pressure of the irrigation liquid to be dropped even when the temperature of irrigation liquid to be dropped exceeds an expected temperature to some extent. Accordingly, popularization and development of the emitter in the technical fields of drip irrigation and endurance tests where long-term dropping is required can be expected.

REFERENCE SIGNS LIST

100 Drip irrigation tube
110 Tube
112 Discharging port
120, 120' Emitter
130 Emitter main body
131 First recess
132 First columnar part
132s First valve seat
133 Second recess
134 Second columnar part
134s Second valve seat
135 First protrusion (Guide part)
136 First groove
137 Second groove
138 Third groove
139 Fourth groove
140 Slit
141 First hole
142 Second Hole (First communicating hole)
143 Third hole
144 Fourth hole
145 Fifth hole (Second communicating hole)
146 Projection
147 Filter part
150 Fifth hole
151 First pressure reducing channel part
152 Sixth hole
153 Second pressure reducing channel part
154 Third pressure reducing channel part
155 Seventh hole
156 Third recess
157 Second protrusion
158 Third protrusion
159 Fourth protrusion 160 Fifth protrusion
170 First diaphragm part
171 First film part
172 Valve element
172' Valve part
1721' Valve element
1722' Connecting portion
1723' Leg portion
173 First peripheral wall portion
180 Second diaphragm part
181 Second film part
183 Second peripheral wall portion
190' Film
200 Intake part
300 First flow rate adjusting part
400 Second flow rate adjusting part
500 Discharging part

What is claimed is:

1. An emitter configured to be joined to an inner wall surface of a tube for carrying irrigation liquid at a position corresponding to a discharging port of the tube for communicating between an inside and an outside of the tube, and configured to discharge the irrigation liquid in the tube at a constant rate out of the tube from the discharging port, the emitter being made of a resin, the emitter comprising:
   an intake part configured to communicate with a space in the tube when the emitter is joined to the tube;
   a pressure reducing channel part communicating with the intake part, and configured to form a pressure reducing channel for carrying the irrigation liquid while reducing a pressure of the irrigation liquid;
   a first flow rate adjusting part communicating with the pressure reducing channel part, and configured to adjust a flow rate of the irrigation liquid depending on a pressure of the irrigation liquid in the tube;
   a second flow rate adjusting part communicating with the pressure reducing channel part and the first flow rate adjusting part, and configured to adjust the flow rate of the irrigation liquid depending on the pressure of the irrigation liquid in the tube; and
   a discharging part communicating with the second flow rate adjusting part, and configured to face the discharging port when the emitter is joined to the tube,
   wherein the first flow rate adjusting part includes:
      a first valve seat,
      a first communicating hole that opens at the first valve seat and that communicates with the second flow rate adjusting part,
      a first diaphragm part having flexibility and disposed away from the first valve seat, the first diaphragm part being configured to bend toward the first valve seat when the pressure of the irrigation liquid in the tube is exerted on the first diaphragm part, and
      a valve element disposed between the first diaphragm part and an opening portion of the first communicating hole such that there is a gap between the valve element and the opening portion of the first communicating hole,
   wherein the valve element is moved toward the first communicating hole as the first diaphragm part bends toward the first valve seat,
   wherein the first flow rate adjusting part further includes a projection over an entire circumference of the opening portion of the first communicating hole, the projection protruding from an inner surface of the first communicating hole in a direction orthogonal to a moving direction in which the valve element is moved, and
   wherein the valve element is of such a shape that, when a moving distance of the valve element is equal to or less than a predetermined value, the gap becomes narrower as the valve element is moved, and when the moving distance of the valve element is greater than the predetermined value, the gap becomes wider as the valve element is moved.

2. The emitter according to claim 1, wherein the first flow rate adjusting part further includes a plurality of guide parts disposed on a valve-element side to surround the opening portion of the first communicating hole and to be spaced from one another, the plurality of guide parts being configured to direct the valve element into the first communicating hole.

3. The emitter according to claim 1, wherein the first diaphragm part and the valve element are a one-piece part.

4. The emitter according to claim 1, wherein the second flow rate adjusting part includes:
   a second valve seat,
   a second communicating hole that opens at the second valve seat and that communicates with the discharging part, and
   a second diaphragm part having flexibility and disposed away from the second valve seat, the second diaphragm part being configured to bend toward the second valve seat when the pressure of the irrigation liquid in the tube is exerted on the second diaphragm part.

5. A drip irrigation tube, comprising:
   a tube including a discharging port for discharging irrigation liquid; and
   the emitter according to claim 1 that is joined to the inner wall surface of the tube at a position corresponding to the discharging port.

6. An emitter configured to be joined to an inner wall surface of a tube for carrying irrigation liquid at a position corresponding to a discharging port of the tube for communicating between an inside and an outside of the tube, and configured to discharge the irrigation liquid in the tube at a constant rate out of the tube from the discharging port, the emitter being made of a resin, the emitter comprising:
   an intake part configured to communicate with a space in the tube when the emitter is joined to the tube;
   a pressure reducing channel part communicating with the intake part, and configured to form a pressure reducing channel for carrying the irrigation liquid while reducing a pressure of the irrigation liquid;
   a first flow rate adjusting part communicating with the pressure reducing channel part, and configured to adjust a flow rate of the irrigation liquid depending on a pressure of the irrigation liquid in the tube;
   a second flow rate adjusting part communicating with the pressure reducing channel part and the first flow rate adjusting part, and configured to adjust the flow rate of the irrigation liquid depending on the pressure of the irrigation liquid in the tube; and
   a discharging part communicating with the second flow rate adjusting part, and configured to face the discharging port when the emitter is joined to the tube,
   wherein the first flow rate adjusting part includes:
      a first valve seat,
      a first communicating hole that opens at the first valve seat and that communicates with the second flow rate adjusting part, a first diaphragm part having flexibility and disposed away from the first valve seat, the first diaphragm part being configured to bend toward the first valve seat when the pressure of the irrigation liquid in the tube is exerted on the first diaphragm part, and a valve element disposed between the first diaphragm part and an opening portion of the first communicating hole such that there is a gap between the valve element and the opening portion of the first communicating hole, wherein the second flow rate adjusting part includes:

a second valve seat, a second communicating hole that opens at the second valve seat and that communicates with the discharging part, and a second diaphragm part having flexibility and disposed away from the second valve seat, the second diaphragm part being configured to bend toward the second valve seat when the pressure of the irrigation liquid in the tube is exerted on the second diaphragm part, wherein the valve element is moved toward the first communicating hole as the first diaphragm part bends toward the first valve seat, and wherein the valve element is of such a shape that, when a moving distance of the valve element is equal to or less than a predetermined value, the gap becomes narrower as the valve element is moved, and when the moving distance of the valve element is greater than the predetermined value, the gap becomes wider as the valve element is moved.

7. The emitter according to claim 6, wherein the first flow rate adjusting part further includes a plurality of guide parts disposed on a valve-element side to surround the opening portion of the first communicating hole and to be spaced from one another, the plurality of guide parts being configured to direct the valve element into the first communicating hole.

8. The emitter according to claim 6, wherein the first diaphragm part and the valve element are a one-piece part.

9. A drip irrigation tube, comprising:

a tube including a discharging port for discharging irrigation liquid; and the emitter according to claim 6 that is joined to the inner wall surface of the tube at a position corresponding to the discharging port.

\* \* \* \* \*